US006047801A

United States Patent [19]

Liao

[11] Patent Number: 6,047,801

[45] Date of Patent: Apr. 11, 2000

[54] RATCHET SCREWDRIVER

[76] Inventor: Yung-Chuan Liao, 2F, No.3-1, Alley15, Lane Shui Ching, Peitun District., Taichung 406, Taiwan

[21] Appl. No.: 08/985,664

[22] Filed: Dec. 9, 1997

[51] Int. Cl.[7] ..................... F16D 11/06

[52] U.S. Cl. ..................... 192/43.2; 192/46; 192/47; 81/63.1

[58] Field of Search ..................... 81/63.1, 60, 58; 192/43, 43.2, 46, 47

[56] References Cited

U.S. PATENT DOCUMENTS

| | | | |
|---|---|---|---|
| 541,130 | 6/1895 | Swan | 81/63.1 |
| 1,421,792 | 7/1922 | Linden | 81/60 |
| 1,475,274 | 11/1923 | Blood | 192/43 |
| 1,508,512 | 9/1924 | Farley | 192/43 |
| 2,720,296 | 10/1955 | Briglia | 192/43.1 |
| 5,570,616 | 11/1996 | Thompson et al. | 81/63.1 |
| 5,573,093 | 11/1996 | Lee | 81/63.1 |
| 5,582,081 | 12/1996 | Lin | 81/63.1 |
| 5,609,078 | 3/1997 | Yang | 81/63.1 |
| 5,642,794 | 7/1997 | Chuang et al. | 81/63.1 |
| 5,685,204 | 11/1997 | Braun | 81/63.1 |
| 5,687,820 | 11/1997 | Lin | 81/63.4 |
| 5,711,193 | 1/1998 | Eggert et al. | 81/63.1 |
| 5,910,196 | 6/1999 | Huang | 81/60 |
| 5,974,915 | 11/1999 | Chou | 81/63.1 |

*Primary Examiner*—James G. Smith
*Assistant Examiner*—David B. Thomas

[57] ABSTRACT

An improved ratchet screwdrivers utilizes a curved spring to encircle two engaging gear blocks at the ratchet gear portion of the transmission shaft, and then a rotating coupling is used to shift the position of the slide in order to designate the operating direction of the transmission shaft. It indicates that when a certain side of the engaging gear block needs to be activated for locking purpose, it needs to disengage the engaging gear block from the ratchet gear part so that its engaging function is disabled. As a result, because one side of the coiled spring is compressed by the external force, the other will be further compressed to the engaging gear block that has not shifted due to its retaining force, thus a more powerful driving force is generated.

6 Claims, 4 Drawing Sheets

RATCHET SCREWDRIVER

BACKGROUND OF THE INVENTION

1. Field of the invention

The present invention relates to a ratchet control device on a ratchet screwdriver; more particularly, the present invention generates more powerful driving dynamic.

2. Description of the prior art

Commonly known ratchet screwdrivers utilize a resisting component with a matching rotational dial, and by using that resisting component to engage the pitches on the transmission shaft in order to produce an engaging feature to convey the driving force. Referring to FIGS. 7, 8, and 9, they are the current most frequently seen three basic types of ratchet structures. As described above, all of them rely on the position shift of the rotational dial 80 by making the corresponding inserted gear 81 or the insertion piece 82 directly or indirectly engage with the corresponding portion of the ratchet 84 on the transmission shaft 83 to achieve a unidirectional transmission purpose.

Therefore, when insertion hole in front of the transmission shaft 83 is inserted with the screwdriver tip and aimed at the screw for exerting pressure, that inserted gear 81 or the insertion piece 892 will directly sustain the tensile conveyed from the ratchet portion 84 of the transmission shaft 83. Yet the position capacity and structural strength of the rotational dial 80 must determine the dynamic retaining value of the inserted gear 81 or the insertion piece 82. However, the FIGS. indicate that the rotational dial 80 is a moveable part, and that its surrounding areas have not been furnished with any supporting components to enhance its structural strength after assembly, thus the level of force that the ratchet screwdriver could sustain and maintain is limited.

SUMMARY OF THE INVENTION

The inventor focuses on the existing shortcomings and areas that lack completeness in commonly used method on the ratchet controlled device of a ratchet screwdriver, utilizes the function of an enclosing rotating cover for pushing and stabilizing the position of the gliding piece. In the mean time, the other side of the inserted gear is further embedded into the ratchet portion of the transmission shaft by utilizing the force of the coiled spring, to obtain a more powerful driving force as a prime objective in this invention.

BRIEF DESCRIPTION OF THE INVENTION:

DETAILED DESCRIPTION OF THE PREFERRED EMBODIMENT

Figure 1:
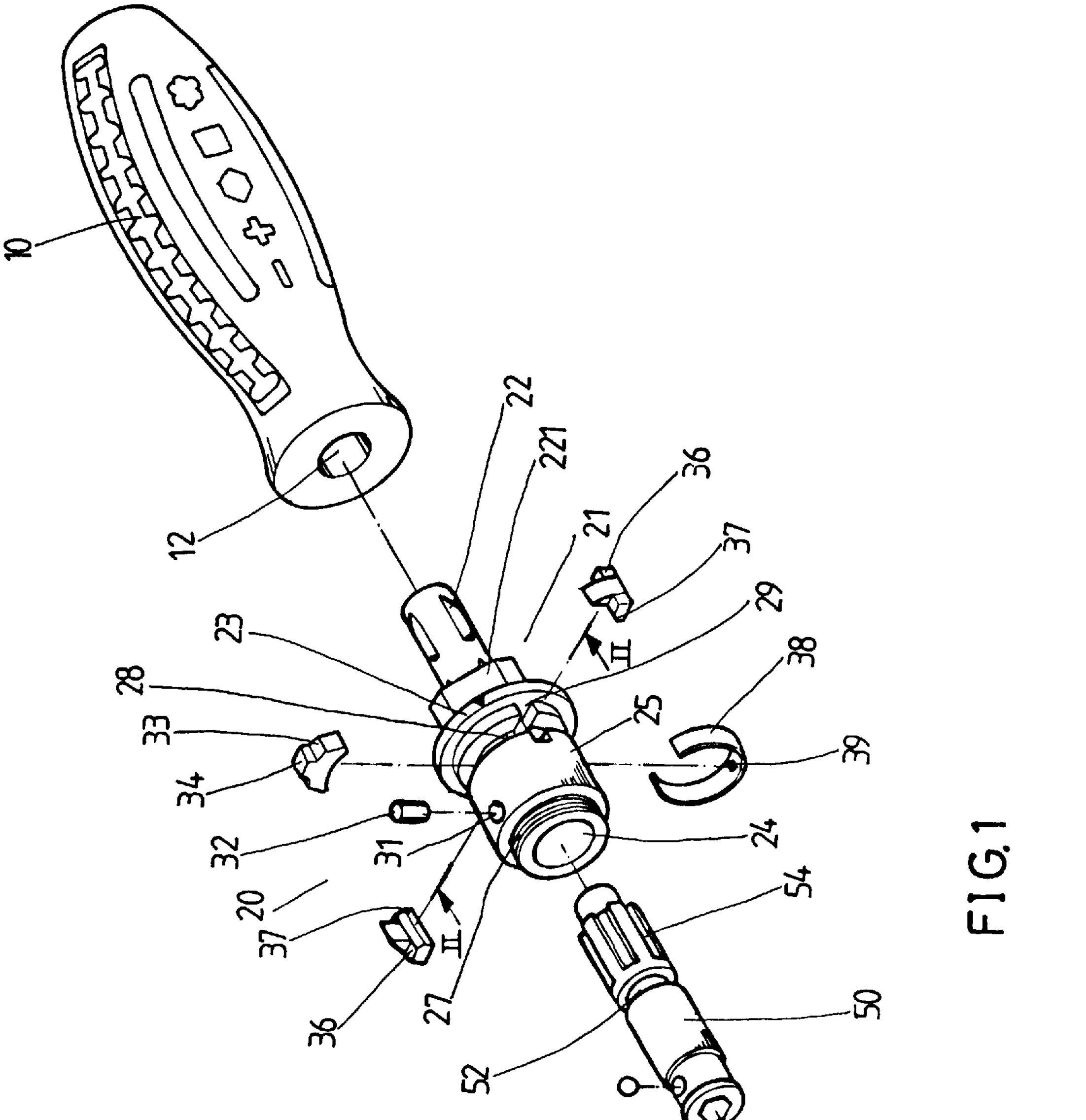
FIG. 1 is an exploded perspective view of the present invention.
Figure 1:
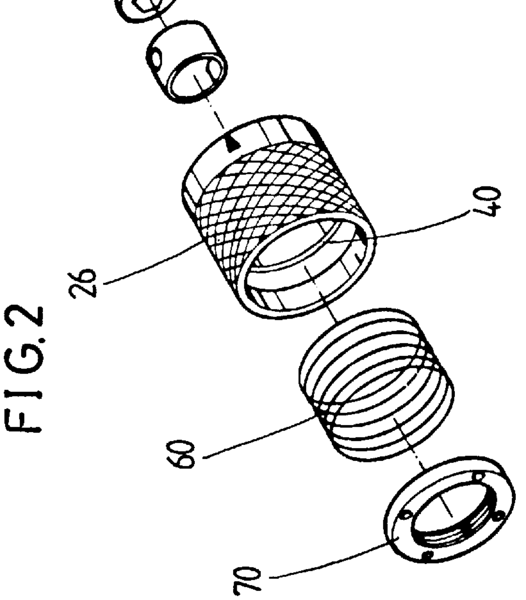
Figure 2:
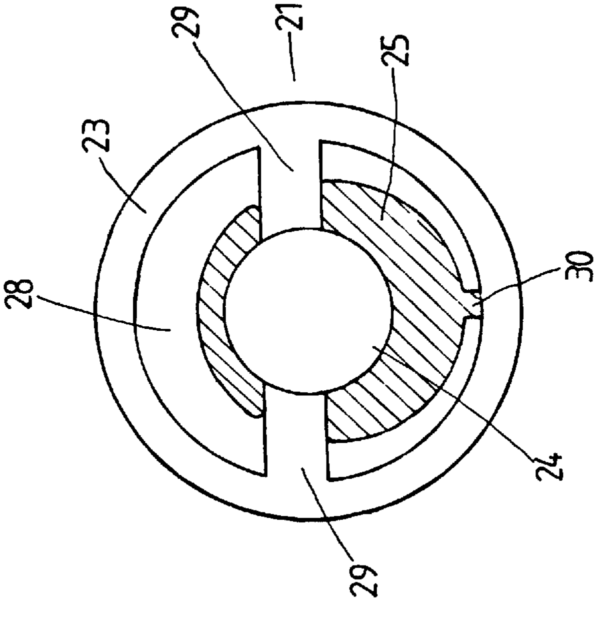
FIG. 2 is an A—A perspective view on the transmission shaft of the present invention.
Figure 3:
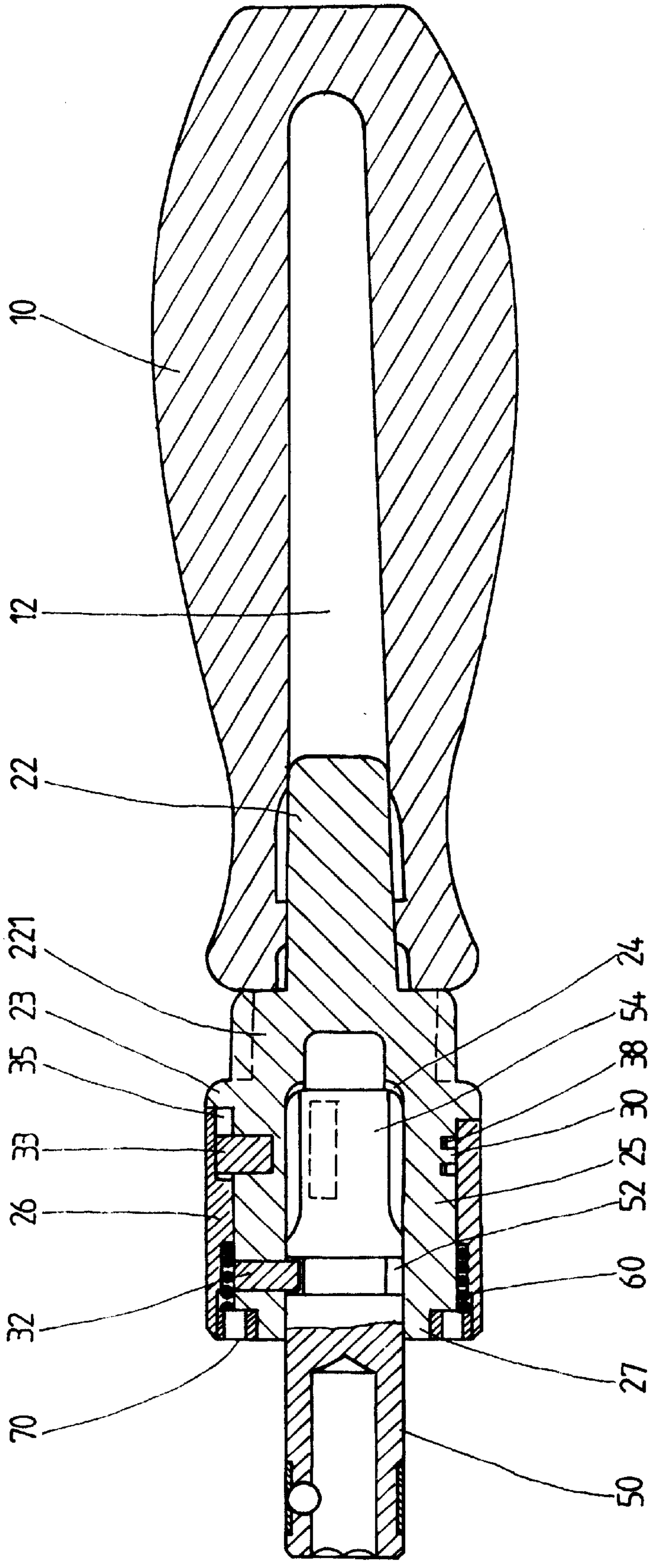
FIG. 3 is the sectional view of the present invention in an assembled state.

Firstly, as shown in FIGS. 1 to 3, they are comprised of an assembly from components of a handle 10, a driving structure 20, a transmission shaft 50, a coil spring 60, and a screw cap 70. Among which, the driving structure 20 consists of:

A driving structure 21, its one side is a narrow diameter inserting shaft 22, for inserting to the opening 12 on the handle 10 and position it, The center has a wider diameter of a stop device 23. The other side is equipped with a deep hold 24 of a connecting part 25, for inserting a coupling 26. Then on the outside of the receiving section 25 is furnished with outer threads 27 for accommodating the spring coil 60 before putting the screw cap 70 over to position it. Furthermore, at a proper position on the stop 23 at the receiving section 25 is equipped with a centrifugal notched ring 28, while the two sides of the centrifugal are furnished with two horizontal holes 29 that are connected to the deep hole 24. And the bottom of the notched ring 28 is equipped with an inserting slot 30. Thereafter, the surface of the receiving portion 25 is equipped with a through hole 31 to the insertion of an insert 32 into that through hole 31 after the transmission shaft 50 has been inserted into the deep hole 24 in order to position the transmission shaft 50 in the positioning slot 52 to accomplish positioning.

A slide 33, which is place on top of the notched ring 28 around the receiving portion 25 of the driving structure 21. Its top part contains a protrusion 34 which is used to match the corresponding engaging grove 35 on the rotating coupling 26 so that the two will form an relaying structure. In addition, its two sides appear in a slanted surface used to push the inserted gear 36.

Two inserted gear blocks 36 in the shape of an inverted T are each correspondingly attached to the notches 29 on the centrifugal notched ring 28 at the receiving portion 25 of the driving structure 21. Its horizontal part is equipped with skewed engaging pitches 37, which are used to engage with the ratchet gear 54 on the transmission shaft 50.

A coiled spring 38, which is placed from bottom and up over on the notched ring 28 at the receiving portion 25 of the driving structure 21, and it is wrapped over the circumference of the two inserted gear blocks 36. Then its bottom is equipped with a positioning hole 39 to facilitate the insertion of an insert 30 for positioning purpose.

A rotating coupling 26, which is placed over the receiving portion 25 of the driving structure 21. On one side of its inner hole, there is a pushing rim 40 used to sustain the coiled spring 60 in position. At this time, the rotating coupling 26 may then be used in a rotational operation.

Figure 4:
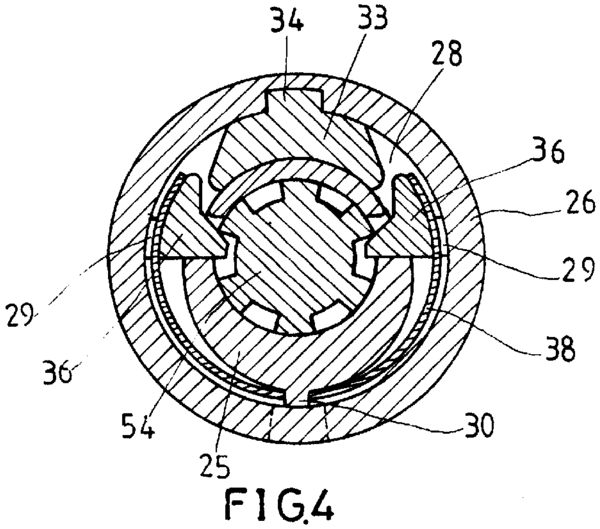
FIG. 4 is one schematic illustration of the present invention in motion.

Utilizing the assembly of the foregoing components, please refer to the illustration shown in FIG. 4, when the slide 33 is located at the center position of the centrifugal notched ring 28, the two pushing surfaces along its two sides have not contacted any of the inserted gear blocks 36, hence these inserted gear blocks 36 will push through openings 29 due to the coil spring's 38 compression under normal condition., so that the stop pitches 37 and the ratchet gears 54 on the transmission shaft 50 will engage. It further incorporates the transmission shaft 50 to coordinate with the handle 10 for implementing a dual directional operation.

Figure 6:
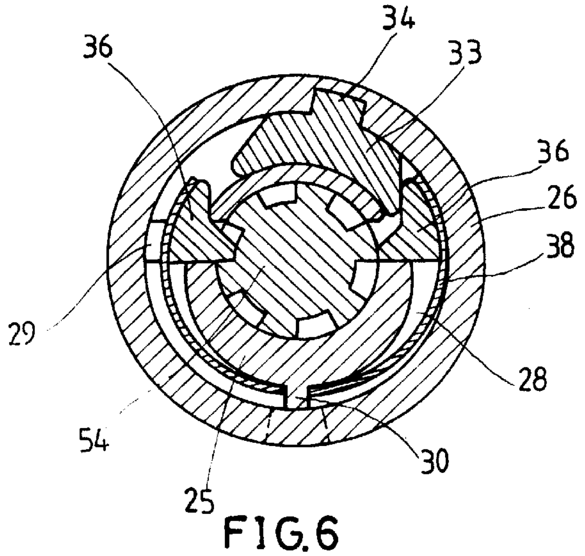
FIG. 6 is yet another schematic illustration of the present invention in motion.
Figure 5:
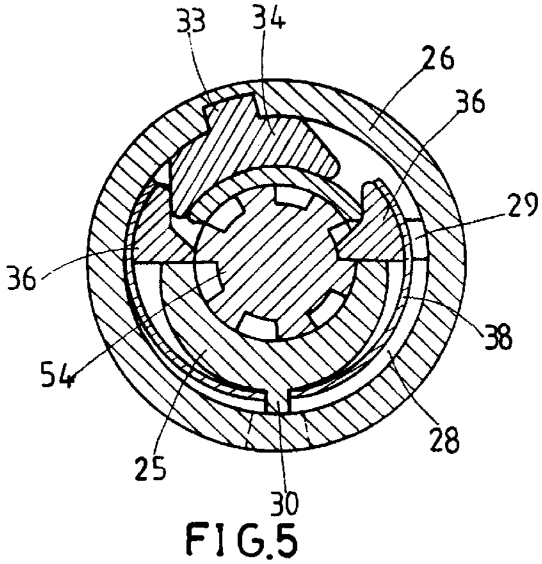
FIG. 5 is one schematic illustration of the present invention in motion.
Figure 7:
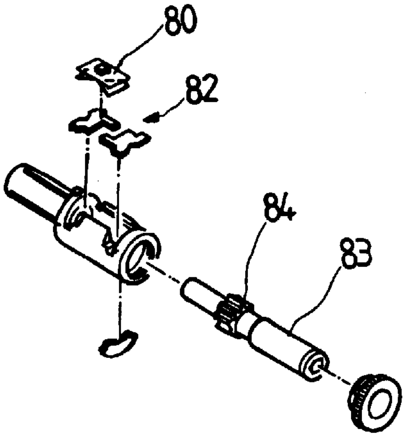
FIG.7 PRIOR ART
FIG. 7 is a schematic illustration of said ratchet screwdriver according to the prior art.
Figure 8:
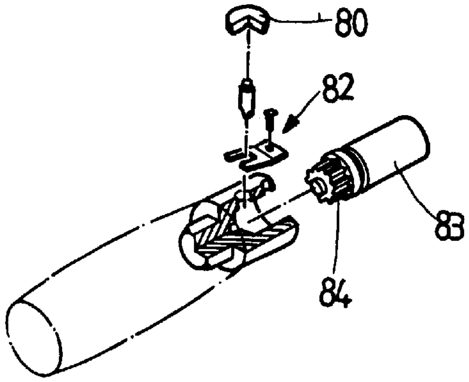
FIG.8 PRIOR ART
FIG. 8 is a schematic illustration of said ratchet screwdriver according to the prior art.
Figure 9:
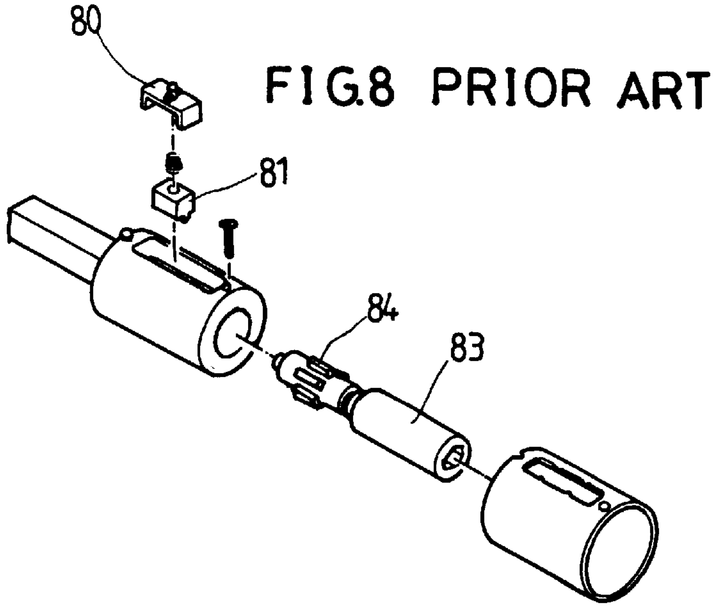
FIG.9 PRIOR ART
FIG. 9 is a schematic illustration of said ratchet screwdriver according to the prior art.

Furthermore, as shown in FIGS. 5 and 6, when the rotation of the rotating coupling 26 is used to make the slide 33 move, that slide 33 will push the corresponding inserted gear blocks 36 to make the engaging pitches 37 to disengage from the ratchet gears 54 of the transmission shaft 50 to lose its engaging function. Yet the other inserted gear block 36 that has not been pushed will generate an engaging function to make the inserted gear block 36 to further penetrate onto the corresponding ratchet gear parts 54 due to the coiled spring's 38 retaining strength (due to outward expansion from force exerted on the other side) in addition, due to the forceful positioning capability of the rotating coupling 25 (owing to the pushing of the c oil ed spring 60), a substantial driving force is generated.

Finally, between the narrow diameter side of the capping shaft 22 the driving structure 21, and the stop 23 at the wider diameter side is a square axial section 221: its function is to support the exertion of force. Which means when larger force is being exerted aiming at the screw to be worked on, a matching sized open wrench may be used (not shown in the FIGS) to clamp on to the square section 221, with one hand holding the handle 10 and the other hand manipulate the open wrench to produce a larger driving force.

Having shown and described a preferred embodiment of the present invention by way of example, it should be realized that structural changes could be made and other example given without departing from either the spirit or scope of this invention.

What is claimed is:

1. A ratchet transmission system for a ratchet screwdriver comprising:

a) a stop flange including an inserting shaft located on a first side of the stop flange, a connecting part located on a second side of the stop flange, the connecting part having a smaller diameter than the stop flange, a deep hole extending into the connecting part from one end thereof, a circumferential groove extending around the connecting part and two holes communicating with the circumferential groove and the deep hole;

b) a transmission shaft having a ratchet gear portion located in the deep hole;

c) a connecting device connecting the transmission shaft to the connecting part so as to permit relative rotation therebetween, but prohibit relative axial movement therebetween;

d) two gear blocks located in the circumferential groove, each gear block having a portion with an engaging pitch extending through one of the two holes;

e) a curved spring located in the circumferential groove, the curved spring having two end portions, each end portion contacting one of the two gear blocks so as to bias the engaging pitches of the gear blocks into engagement with the ratchet gear portion of the transmission shaft;

f) a slide movably located in the circumferential groove between the end portions of the curved spring; and, g) a coupling member rotatably mounted on the connecting part and connected to the slide, whereby rotation of the coupling member causes the slide to move between a central position, wherein it is out of contact with both gear blocks thereby enabling the gear blocks to both engage the ratchet gear, and opposite drive positions wherein the slide contacts one of the two gear blocks to thereby move the contacted gear block out of engagement with the ratchet gear enabling the other gear block to exert a driving force on the ratchet due to the force exerted on the other gear block by the curved spring.

2. The ratchet transmission of claim 1 wherein the connecting device comprises a positioning slot in the transmission shaft and an insert attached to the connecting part and extending into the positioning slot.

3. The ratchet transmission of claim 1 further comprising an axial section located between the flange and the inserting shaft configured to be drivingly gripped by a wrench.

4. The ratchet transmission of claim 3 wherein the axial section has a square cross-sectional configuration.

5. The ratchet transmission of claim 1 wherein the inserting section is configured to engage an opening in a handle.

6. The ratchet transmission of claim 1 further comprising:

a) a threaded portion on the connecting part;

b) a pushing ring on the coupling member;

c) a screw cap threaded onto the threaded portion of the connecting port; and, d) a coil spring acting on the screw cap and the pushing ring to urge the coupling member into contact with the stop flange.

* * * * *